Patented Mar. 16, 1954

2,672,483

UNITED STATES PATENT OFFICE 2,672,483

2-DIPHENYLACETYL-1,3-INDANDIONE AND SALTS THEREOF

Donald G. Thomas, Kalamazoo, Mich., assignor to The Upjohn Company, Kalamazoo, Mich., a corporation of Michigan No Drawing. Application July 16, 1951,
Serial No. 237,065

5 Claims. (Cl. 260—590)

This invention relates to new compositions of matter which are therapeutically useful as anticoagulants.

More specifically, the invention relates to a particular acylindandione, 2-diphenylacetyl-1,3-indandione, which is represented by the following formula:

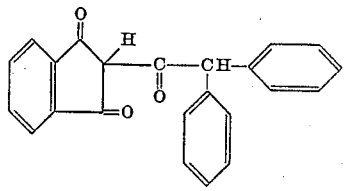

and non-toxic metal salts thereof.

It is an object of the present invention to provide new and useful compositions of matter, organic compounds which are extremely useful as anticoagulants. Other objects of the invention will become apparent hereinafter.

The 2-diphenylacetyl-1,3-indandione of this invention is a pale yellow crystalline compound which melts at 146–147 degrees centigrade. It is insoluble in water, soluble in acetone and acetic acid and slightly soluble in benzene and hot ethanol, from the latter of which it can be recrystallized. It is acidic in nature due to the enolizable hydrogen possessed by its 1,3-diketone structure and accordingly it reacts with bases to form salts. These salts, which are also included within the scope of the present invention, are formed by reaction with sodium or potassium hydroxide and, although rather sparingly soluble in water, are more soluble than the parent compound and therefore more convenient to use.

2-diphenylacetyl-1,3-indandione can be prepared by the condensation of a dialkyl phthalate and diphenylacetone in an inert solvent in the presence of an alkali metal alkoxide. It can also be prepared by reaction between the sodio-derivative of 1,3-indandione and diphenylacetyl chloride in an inert solvent.

The following example illustrates in greater detail the practice of the invention, without however being in any way limiting.

Example 1.—2-diphenylacetyl-1,3-indandione

A solution of sodium methoxide was prepared by adding 2.76 grams (0.12 mole) of sodium to fifty milliliters of absolute methanol and gently warming the mixture to effect complete solution of the sodium. To this was added 300 milliliters of dry benzene with vigorous stirring, whereafter excess methanol was removed by concentrating the mixture to a volume of about 100 milliliters. To the resulting sodium methoxide suspension was added a solution of 19.4 grams (0.1 mole) of dimethyl phthalate in 200 milliliters of dry benzene. The mixture was heated to boiling and a solution of 21 grams (0.1 mole) of diphenylacetone in 200 milliliters of dry benzene was added dropwise thereto. During addition approximately 200 milliliters of liquid, which consisted of benzene together with methanol formed during the course of the reaction, was distilled from the reaction mixture. After addition of the diphenylacetone, the mixture was heated under reflux for about six hours, cooled and stirred vigorously with 200 milliliters of five percent sodium hydroxide solution. The light yellow solid which separated was collected by filtration; the filtrate was reserved for treatment as described below. Suspension in water of the solid, which weighed twelve grams, and acidification of the mixture with dilute hydrochloric acid produced a gum which soon crystallized. Recrystallization of this solid from ethanol gave 10.2 grams (thirty percent) of 2-diphenylacetyl-1,3-indandione as a light yellow crystalline solid, which melted at 146–147 degrees centigrade.

The filtrate mentioned above consisted of three layers. An oily layer which was present between the aqueous and benzene layers was separated, acidified and extracted with ether. The aqueous layer was likewise separated, acidified and extracted with ether. The extracts were combined, dried and evaporated to yield a heavy gum which was crystallized from ethanol to give an additional 2.5 grams of product which melted at 146–147 degrees centigrade. The total yield of 2-diphenylacetyl-1,3-indandione was 12.7 grams (37 percent).

2-diphenylacetyl-1,3-indandione can also be prepared by the reaction between diphenylacetyl chloride and the sodio-derivative of 1,3-indandione [which is prepared by a method similar to that described by Weygand, Berichte 61B, 687 (1928) for the preparation of the sodio-derivative of dibenzoylmethane], although the yield is not as high.

Example 2.—The sodium salt of 2-diphenylacetyl-1,3-indandione

Solutions of the sodium salt of 2-diphenylacetyl-1,3-indandione, which were satisfactory for use, were prepared as follows:

A. One hundred milligrams of 2-diphenylacetyl-1,3-indandione was dissolved in five milliliters of ethanol with warming and the warm alcoholic solution was added with stirring to 75 milliliters of water containing four drops of one normal sodium hydroxide solution. To the resulting suspension, one normal sodium hydroxide solution was added dropwise until solution was effected, the pH not being allowed to exceed eleven even though some haziness was occasionally present which did not disappear on addition of the sodium hydroxide. Dilution to 100 milliliters gave a solution of the sodium salt of 2-diphenylacetyl-1,3-indandione containing the equivalent of one milligram of 2-diphenylacetyl-1,3-indandione per milliliter.

B. Five hundred milligrams of 2-diphenylacetyl-1,3-indandione was dissolved in fifty milliliters of ethanol and the solution added to eighty milliliters of water. A one normal sodium hydroxide solution was then added dropwise to the resulting suspension until solution was effected. The solution was concentrated under reduced pressure to a volume of about 45 milliliters and about ten grams of dextrose added thereto. Concentration under reduced pressure was continued until the solution had the consistency of a thick syrup. This syrup was readily soluble in water and solutions of desired concentrations were prepared by dissolving it in the calculated amount of water.

Salts with other non-toxic metals such as calcium, potassium and the like can be prepared in a similar manner, using the corresponding basic solution of the desired metal in place of the sodium hydroxide employed in the above illustrative examples.

Although the present invention has been described in the foregoing specification in its preferred embodiments, it is to be understood that the invention is not limited to the exact details shown and described, and that numerous variations and modifications, which will be apparent to one skilled in the art, can be made without departing from the scope of the invention as defined in the appended claims.

I claim:

1. A compound selected from the group consisting of (a) 2-diphenylacetyl-1,3-indandione, having the formula:

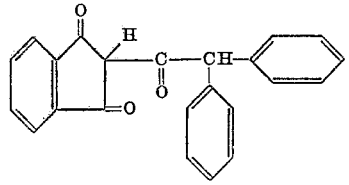

and (b) salts thereof with a non-toxic metal cation.

2. 2-diphenylacetyl-1,3-indandione.

3. A salt of 2-diphenylacetyl-1,3-indandione with a non-toxic metal cation.

4. The sodium salt of 2-diphenylacetyl-1,3-indandione.

5. An alkali-metal salt of 2-diphenylacetyl-1,3-indandione.

DONALD G. THOMAS.

References Cited in the file of this patent

UNITED STATES PATENTS

| Number | Name | Date |
|---|---|---|
| 2,310,949 | Ford et al. | Feb. 16, 1943 |